US012670369B2

(12) United States Patent
Cassidy et al.

(10) Patent No.: US 12,670,369 B2
(45) Date of Patent: Jun. 30, 2026

(54) CENTRAL SCHEDULER AND INSTRUCTION DISPATCHER FOR A NEURAL INFERENCE PROCESSOR

(71) Applicant: INTERNATIONAL BUSINESS MACHINES CORPORATION, Armonk, NY (US)

(72) Inventors: Andrew S. Cassidy, San Jose, CA (US); Myron D. Flickner, San Jose, CA (US); Pallab Datta, San Jose, CA (US); Hartmut Penner, San Jose, CA (US); Rathinakumar Appuswamy, San Jose, CA (US); Jun Sawada, Austin, TX (US); John V. Arthur, Mountain View, CA (US); Dharmendra S. Modha, San Jose, CA (US); Steven K. Esser, San Jose, CA (US); Brian Taba, Cupertino, CA (US); Jennifer Klamo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 15/965,248

(22) Filed: Apr. 27, 2018

(65) Prior Publication Data

US 2019/0332924 A1 Oct. 31, 2019

(51) Int. Cl.
*G06N 3/08* (2023.01)
*G06N 3/063* (2023.01)
(52) U.S. Cl.
CPC ............... *G06N 3/063* (2013.01); *G06N 3/08* (2013.01)
(58) Field of Classification Search
CPC ............. G06N 3/063; G06N 3/04; G06N 3/08
See application file for complete search history.

(56) References Cited

U.S. PATENT DOCUMENTS 5,712,922 A * 1/1998 Loewenthal ......... G06V 10/145
                                                        706/904
9,015,096 B2 4/2015 Hunzinger
(Continued)

FOREIGN PATENT DOCUMENTS

CN        104641385 A       5/2015
CN        105095967 A      11/2015
(Continued)

OTHER PUBLICATIONS

Wikipedia "Data Buffer," (https://en.wikipedia.org/wiki/Data_buffer : Apr. 1, 2014); archived at Wayback Machine (https://web.archive.org/) > http://web.archive.org/web/20140401001034/https://en.wikipedia.org/wiki/Data_buffer> (Year: 2014).*
(Continued)

*Primary Examiner* — Kakali Chaki
*Assistant Examiner* — Johnathan R Germick
(74) *Attorney, Agent, or Firm* — David K. Mattheis

(57) ABSTRACT

Neural inference processors are provided. Each processor includes a plurality of cores. Each core includes a neural computation unit, an activation memory, and a local controller. The neural computation unit is adapted to apply a plurality of synaptic weights to a plurality of input activations to produce a plurality of output activations. The activation memory is adapted to store the input activations and the output activations. The local controller is adapted to load the input activations from the activation memory to the neural computation unit and to store the plurality of output activations from the neural computation unit to the activation memory. The processor includes a neural network model memory adapted to store network parameters, including the plurality of synaptic weights. The processor includes a global scheduler operatively coupled to the plurality of
(Continued)

500 cores, adapted to provide the synaptic weights from the neural network model memory to each core.

22 Claims, 10 Drawing Sheets

(56) References Cited

U.S. PATENT DOCUMENTS

| | | | |
|---|---|---|---|
| 9,274,793 B2 | 3/2016 | Abdallah | |
| 9,373,074 B2 | 6/2016 | Levin et al. | |
| 9,442,886 B2 | 9/2016 | Lippett | |
| 9,710,265 B1 | 7/2017 | Temam et al. | |
| 10,515,303 B2 * | 12/2019 | Lie | G06F 9/3887 |
| 2013/0073497 A1 * | 3/2013 | Akopyan | G06N 3/04 |
| | | | 706/27 |
| 2014/0365413 A1 | 12/2014 | Rangan | |
| 2016/0062947 A1 | 3/2016 | Chetlur et al. | |
| 2016/0110640 A1 | 4/2016 | Arthur et al. | |
| 2016/0335119 A1 | 11/2016 | Merrill et al. | |
| 2016/0335535 A1 | 11/2016 | Amir et al. | |
| 2017/0011288 A1 | 1/2017 | Brothers et al. | |
| 2017/0078189 A1 | 3/2017 | Han et al. | |
| 2017/0103315 A1 | 4/2017 | Thorson et al. | |
| 2017/0193136 A1 | 7/2017 | Prasad et al. | |
| 2017/0316306 A1 * | 11/2017 | Katayama | G06N 3/063 |
| 2018/0322387 A1 * | 11/2018 | Sridharan | G06N 3/04 |
| 2019/0007332 A1 * | 1/2019 | Fleming | H04L 45/72 |
| 2019/0102669 A1 * | 4/2019 | Chen | G06N 3/0454 |

FOREIGN PATENT DOCUMENTS

| | | | |
|---|---|---|---|
| CN | 106201651 A | 12/2016 | |
| CN | 106779059 A | 5/2017 | |
| CN | 106940815 A | 7/2017 | |
| CN | 107454966 A | 12/2017 | |
| JP | H07219919 A | 8/1995 | |
| JP | 2001/188767 A | 7/2001 | |

OTHER PUBLICATIONS

Florian Walter, Florian Röhrbein, & Alois Knoll (2015). Neuromorphic implementations of neurobiological learning algorithms for spiking neural networks. Neural Networks, 72, 152-167. (Year: 2015).*

T. Moreau, M. Wyse, J. Nelson, A. Sampson, H. Esmaeilzadeh, L. Ceze, & M. Oskin (2015). SNNAP: Approximate computing on programmable SoCs via neural acceleration. In 2015 IEEE 21st International Symposium on High Performance Computer Architecture (HPCA) (pp. 603-614). IEEE Computer Society. (Year: 2015).*

Lee, H., Chang, N., Ogras, U et al. (2007). On-chip communication architecture exploration: A quantitative evaluation of point-to-point, bus, and network-on-chip approaches. ACM Transactions on Design Automation of Electronic Systems (TODAES), 12(3), p. 23.

International Search Report and Written Opinion for International Application No. PCT/IB2019/052539 mailed May 15, 2019.

Chinese Office Action for CN Application No. 201980022184.2 dated Sep. 21, 2023.

Office Action for CN Application No. 201980022184.2 dated May 16, 2024.

Office Action for Chinese Application No. 201980022184.2 dated Sep. 16, 2024.

Notice of Reasons for Refusal for JP Application No. 2020-556803 dated Jul. 27, 2022.

The State Intellectual Property Office of People's Republic of China, "Third office action", Jan. 4, 2025, 05 Pages, CN Application No. 201980022184.2.

Notice of Allowance for JP Application No. 2020-556803 dated Jul. 5, 2023.

German Patent Office Action for German Application No. 11 2019 000 676.2 dated Oct. 11, 2022.

Wikipedia Article., "Network on a chip," retrieved online <https://en.wikipedia.org/w/index.php?title=Network_on_a_chip&oldid=>: 4 pages (Retrieved Sep. 19, 2022).

* cited by examiner

Figure 2:
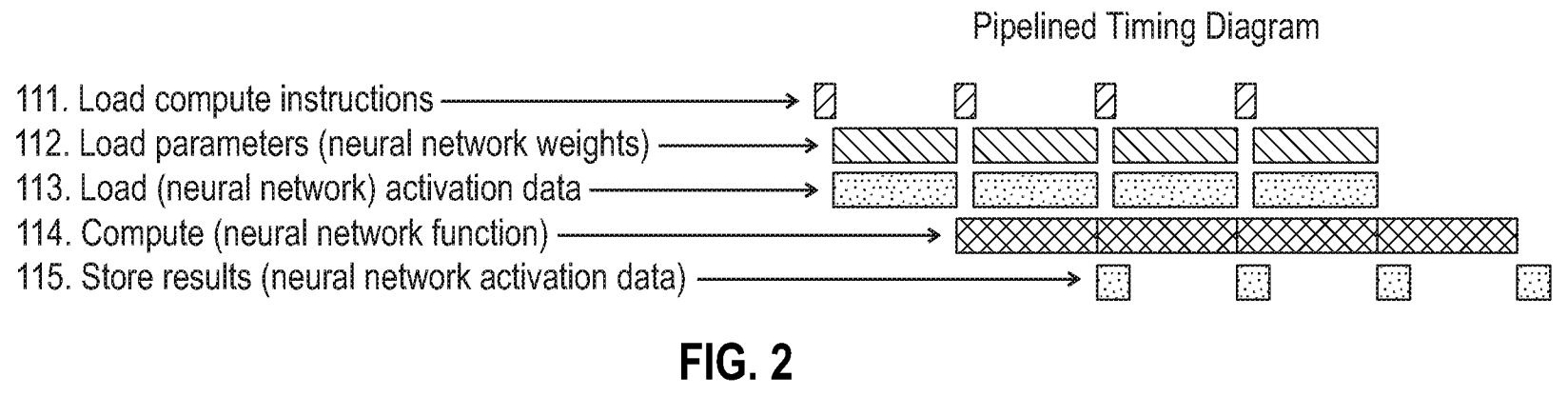

Pipelined Timing Diagram

111. Load compute instructions
112. Load parameters (neural network weights)
113. Load (neural network) activation data
114. Compute (neural network function)
115. Store results (neural network activation data)

CENTRAL SCHEDULER AND INSTRUCTION DISPATCHER FOR A NEURAL INFERENCE PROCESSOR

BACKGROUND

Embodiments of the present disclosure relate to neural network processing components, and more specifically, to a central scheduler and instruction dispatcher for a neural inference processor.

BRIEF SUMMARY

According to embodiments of the present disclosure, neural inference processors are provided. A processor includes a plurality of cores. Each core includes a neural computation unit, an activation memory, and a local controller. The neural computation unit is adapted to apply a plurality of synaptic weights to a plurality of input activations to produce a plurality of output activations. The activation memory is adapted to store the input activations and the output activations. The local controller is adapted to load the input activations from the activation memory to the neural computation unit and to store the plurality of output activations from the neural computation unit to the activation memory. The processor includes a neural network model memory adapted to store the plurality of synaptic weights. The processor includes a global scheduler operatively coupled to the plurality of cores, adapted to provide the synaptic weights from the neural network model memory to each core.

According to embodiments of the present disclosure, neural inference processors are provided. A neural computation unit is provided. The neural computation unit is adapted to apply a plurality of synaptic weights to a plurality of input activations to produce a plurality of output activations. A neural network model memory is adapted to store the plurality of synaptic weights. An activation memory is adapted to store the input activations and the output activations. A scheduler is operatively coupled to the neural computation unit, the neural network model memory, and the activation memory. The scheduler is adapted to: load the synaptic weights from the neural network model memory to the neural computation unit; load the input activations from the activation memory to the neural computation unit; and store the plurality of output activations from the neural computation unit to the activation memory.

According to embodiments of the present disclosure, methods of and computer program products for operating a neural inference processor are provided. A global scheduler provides synaptic weights from a neural network model memory to each of a plurality of cores. A local controller of each core loads input activations from an activation memory of the core to a neural computation unit of the core. A neural computation unit of each core applies the plurality of synaptic weights to the plurality of input activations to produce a plurality of output activations. The local controller of each core stores the plurality of output activations from the neural computation unit of the core to the activation memory of the core.

BRIEF DESCRIPTION OF THE SEVERAL VIEWS OF THE DRAWINGS

FIG. 2 is a pipelined timing diagram for the IPU of FIG. 1.

DETAILED DESCRIPTION

Figure 1:
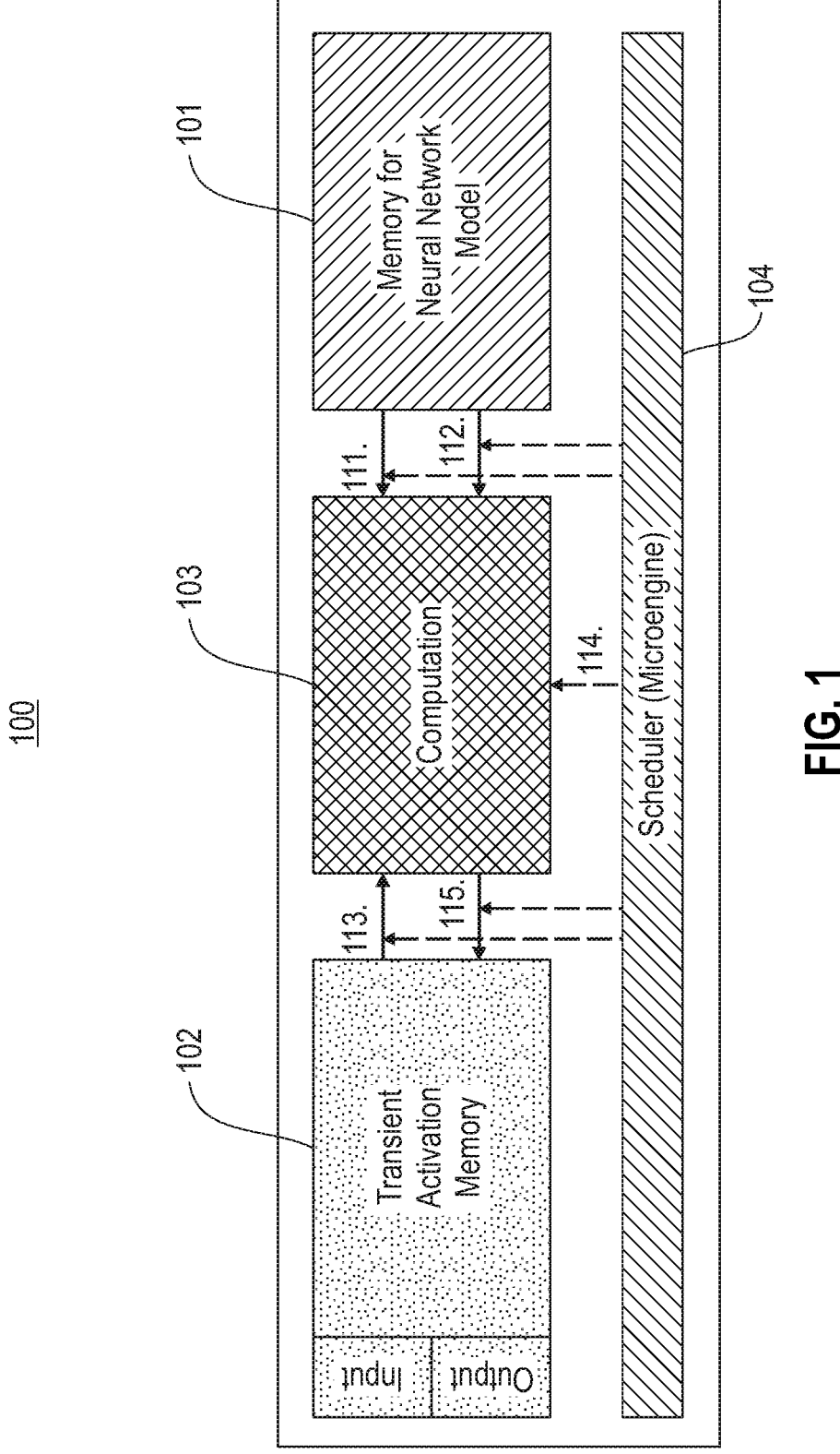
FIG. 1 illustrates an exemplary Inference Processing Unit (IPU) according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a weight tensor, parameter tensor, input tensor, output tensor, and intermediate tensor. The weight tensor contains all of the weights that connect inputs to the layer. The parameter tensor contains all of the parameters that control neuron activation functions in the layer. The input tensor contains all of the data that the layer consumes as input. The output tensor contains all of the data that the layer computes as output. The intermediate tensor contains any data that the layer produces as intermediate computations, such as partial sums.

A neural core is a tileable computational unit that computes one block of an output tensor. A neural core has M inputs and N outputs. In various embodiments, M=N. To compute an output tensor block, a neural core multiplies an M×1 input tensor block with an M×N weight tensor block and accumulates the products into weighted sums that are stored in a 1×N intermediate tensor block. A U×N parameter tensor block contains the U parameters that specify each of the N neuron activation functions that are applied to the intermediate tensor block to produce a 1×N output tensor block.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Referring to FIG. 1, an exemplary Inference Processing Unit (IPU) is illustrated according to embodiments of the present disclosure. IPU 100 includes a memory 101 for the neural network model. As described above, the neural network model may include the synapse weights for a neural network to be computed. IPU 100 includes an activation memory 102, which may be transient. Activation memory 102 may be divided into input and output regions, and stores neuron activations for processing. IPU 100 includes a neural computation unit 103, which is loaded with a neural network model from model memory 101. Input activations are provided from activation memory 102 in advance of each computation step. Outputs from neural computation unit 103 are written back to activation memory 102 for processing on the same or another neural computation unit.

In various embodiments a scheduler 104 is included in IPU 100. In such embodiments, all operations in the IPU are directed by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

Referring to FIG. 2, a pipelined timing diagram is provided for the IPU of FIG. 1. At 111, compute instructions are loaded from model memory 101 to neural computation unit 103. At 112, parameters (e.g., neural network/synaptic weights) are loaded from model memory 101 to neural computation unit 103. At 113, neural network activation data are loaded from activation memory 102 to neural computation unit 103. As noted above, the activations are provided to the axons of the particular neural network defined by the model, and may originate from the same or another neural computation unit, or from outside the system. At 114, neural computation unit 103 performs the computation to generate output neuron activations. In particular, the computation comprises applying the input synaptic weights to the input activations. It will be appreciated that various methods are available for performing such computations, including in silico dendrites, as well as vector multiplication units. At 115, the results from computation are stored in activation memory 102. As pictured, these stages may be pipelined, in order to provide efficient usage of the neural computation unit.

Figure 3:
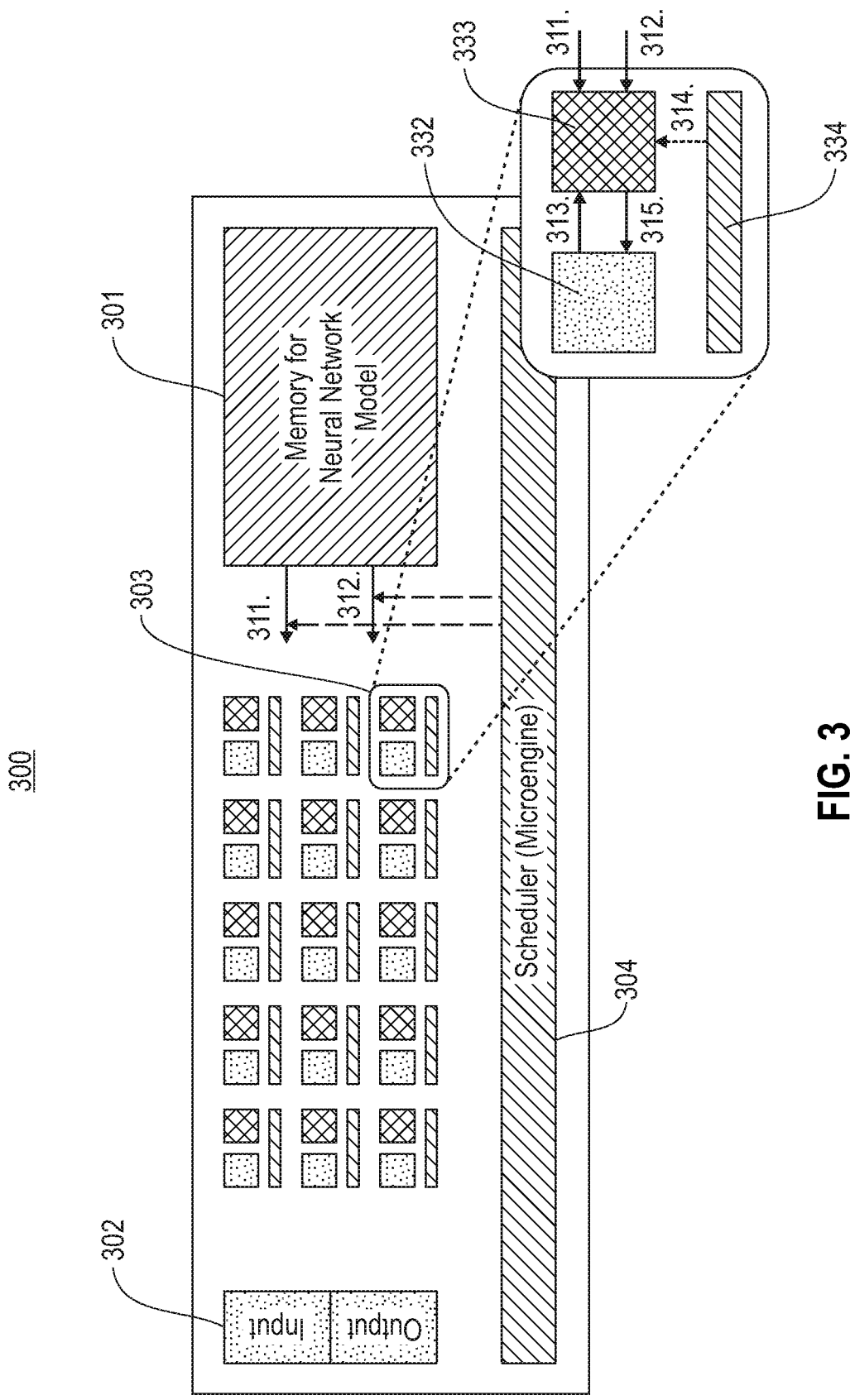
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a model memory 301 for the neural network model. As described above, the neural network model may include the synapse weights for a neural network to be computed. IPU 300 includes an activation memory 302, which may be transient. Activation memory 302 may be divided into input and output regions, and stores neuron activations for processing. IPU 300 includes a plurality of cores 303. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

In various embodiments a global scheduler 304 is included in IPU 300. In various embodiments, a local core controller 334 is included on each core 303. In such embodiments, the direction of operations is shared between the global scheduler (chip microengine) and the local core controller (core microengine). In particular, at 311, compute instructions are loaded from model memory 301 to the neural computation unit 333 on each core 303 by global scheduler 304. At 312, parameters (e.g., neural network/synaptic weights) are loaded from model memory 301 to the neural computation unit 333 on each core 303 by global scheduler 304. At 313, neural network activation data are loaded from activation local activation memory 332 to neural computation unit 333 on each core 303 by local core controller 334. As noted above, the activations are provided to the axons of the particular neural network defined by the model, and may originate from the same or another neural computation unit, or from outside the system. At 314, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 315, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime scheduling of operations in an Inference Processing Unit (IPU). In some embodiments, the operation scheduler is centralized (single scheduler). In some embodiments, the IPU computation is distributed (performed by an array of cores). In some embodiments, runtime scheduling of operations is hierarchical—both a central scheduler and distributed schedulers participate.

The scheduler or schedulers direct the execution of all operations in the IPU. Each scheduler instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
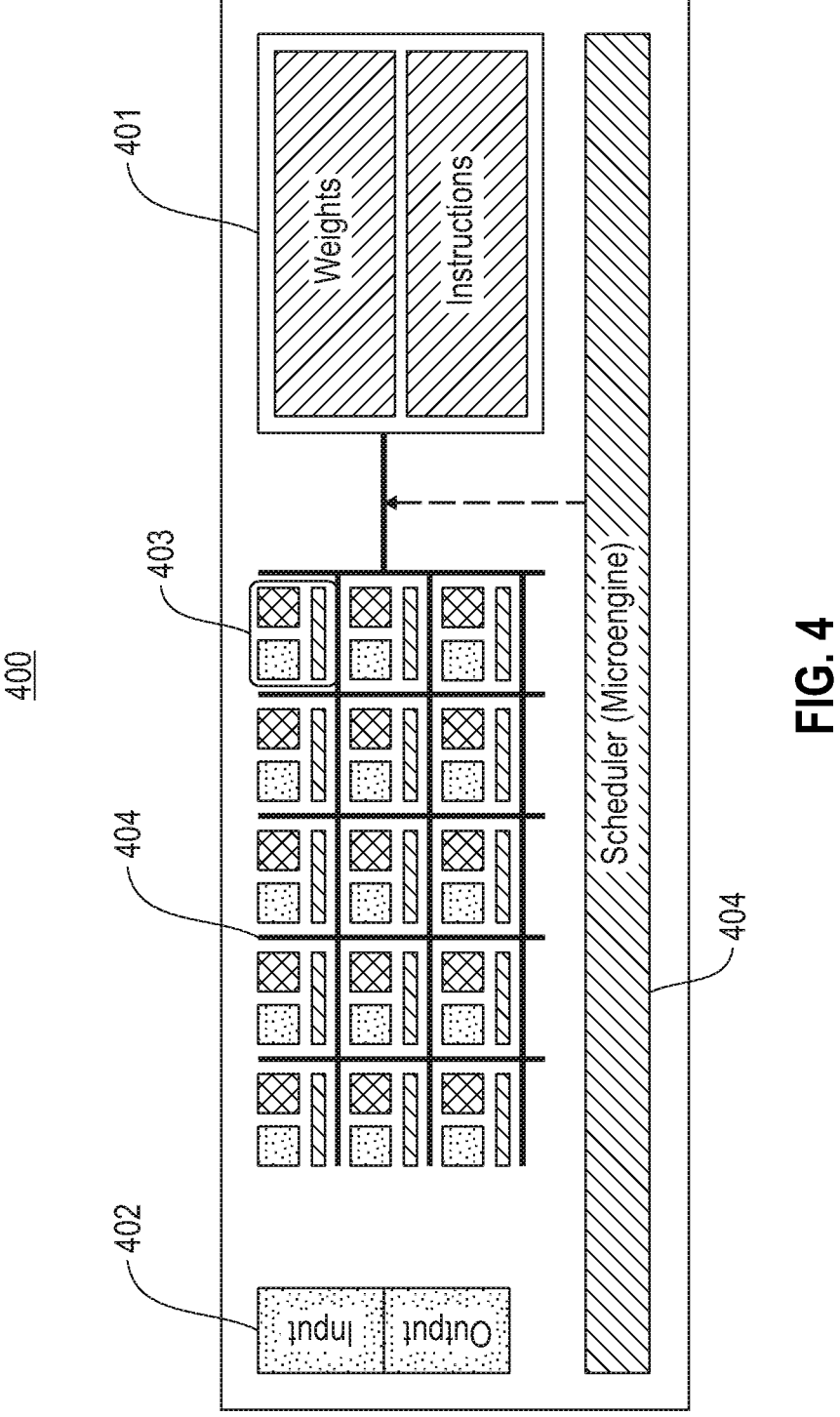
FIG. 4 illustrates a multi-core Inference Processing Unit (IPU) according to embodiments of the present disclosure.

Referring to FIG. 4, a multi-core Inference Processing Unit (IPU) is illustrated according to embodiments of the present disclosure. IPU 400 includes a model memory 401 for the neural network model. As described above, the neural network model may include the synapse weights for a neural network to be computed. In some embodiments, model memory 401 includes one or more physical memories, which may be allocated separately to synaptic weights and instructions. IPU 400 includes an activation memory 402, which may be transient. Activation memory 402 may be divided into input and output regions, and stores neuron activations for processing. IPU 400 includes a plurality of cores 403. Each core 403 may be configured as describe above with regard to FIG. 3.

IPU 400 includes one or more network-on-chip (NoC) 404. As noted above, network weights and instructions are stored in memory 401. To configure each core, the scheduler (chip microengine) 404 generates a read address and creates read transactions from the (weight/instruction) parameter memory 401. The read weights and instructions are sent across the NoC 404 to the destination cores (e.g., 403). The distributed instructions are executed on each core, using the distributed set of weights, on the core's local data.

Accordingly, in some embodiments, the scheduler distributes weight blocks from parameter memory via a Network on Chip (NoC). In some embodiments, the scheduler distributes instructions from instruction memory via a Network on Chip (NoC). In some embodiments, instructions include memory operations, computation operations, and control operations. In some embodiments, one NoC is provided. In some embodiments, multiple NoCs are provided. In some such embodiments, weights are distributions over a different NoC than than instructions. In some embodiments, instruction memory is the same physical memory as the parameter memory, while in some embodiments it is separate.

Figure 5:
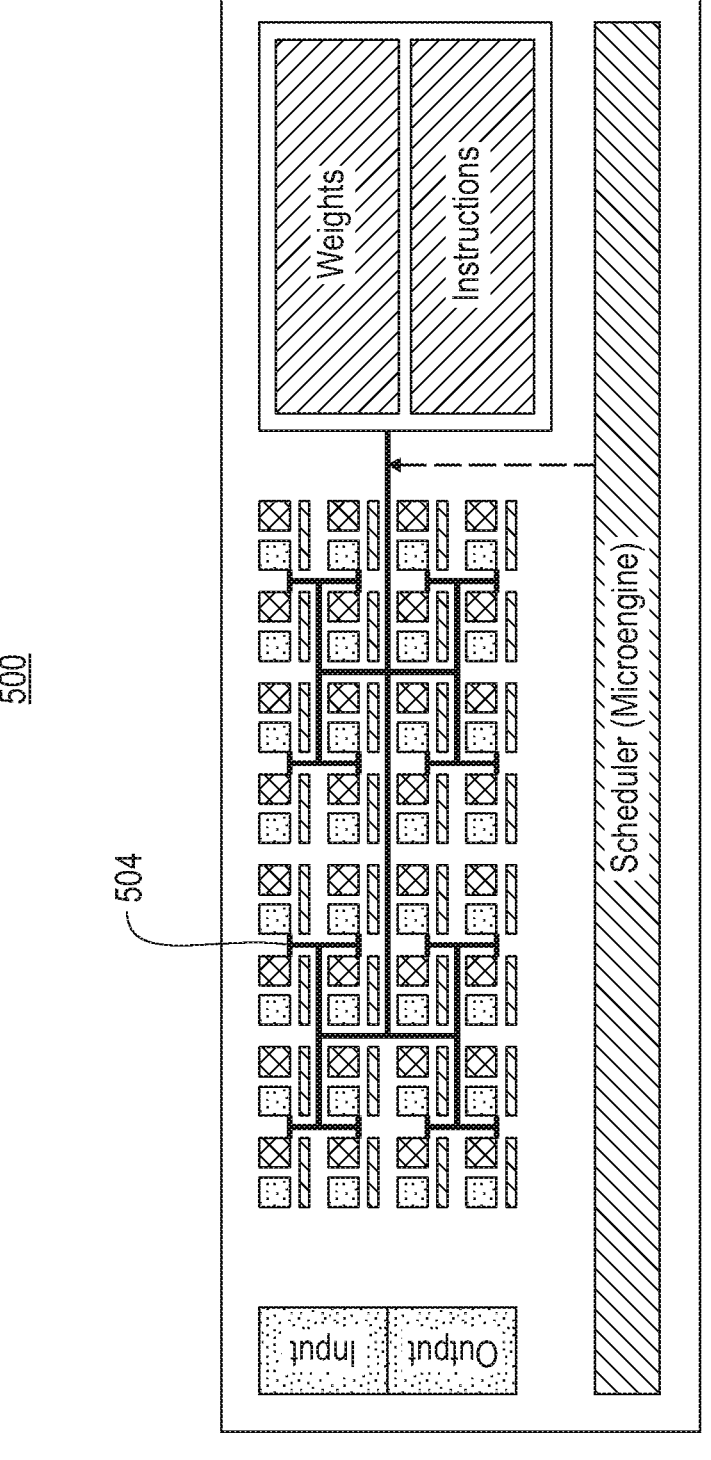
FIG. 5 illustrates an exemplary IPU network-on-chip (NoC) according to embodiments of the present disclosure.

Referring to FIG. 5, an exemplary IPU network-on-chip (NoC) is illustrated according to embodiments of the present disclosure. IPU 400 includes a tree network-on-chip 504. It will be appreciated that such a tree network may be used to distribute weights and instructions to each core contained in IPU.

In particular, in some embodiments, the IPU may operate in a Single Instruction, Multiple Data (SIMD) mode. In such embodiments, the same Weights and Instructions are distributed to all cores. Thus, while each core has different activation data, all weights and instructions are the same for each core.

In some embodiments the IPU may operate in a Multiple Instruction, Multiple Data (MIMD) mode. In such embodiments, different Weights and Instructions are distributed to different cores. Each core has different activation data, as above. In some such MIMD embodiments, the scheduler sends different weights and instructions to each core sequentially. This approach has relatively low throughput if the weights and instructions must be distributed frequently. This approach may have reasonable throughput if the weights and instructions are not distributed frequently.

Figure 6:
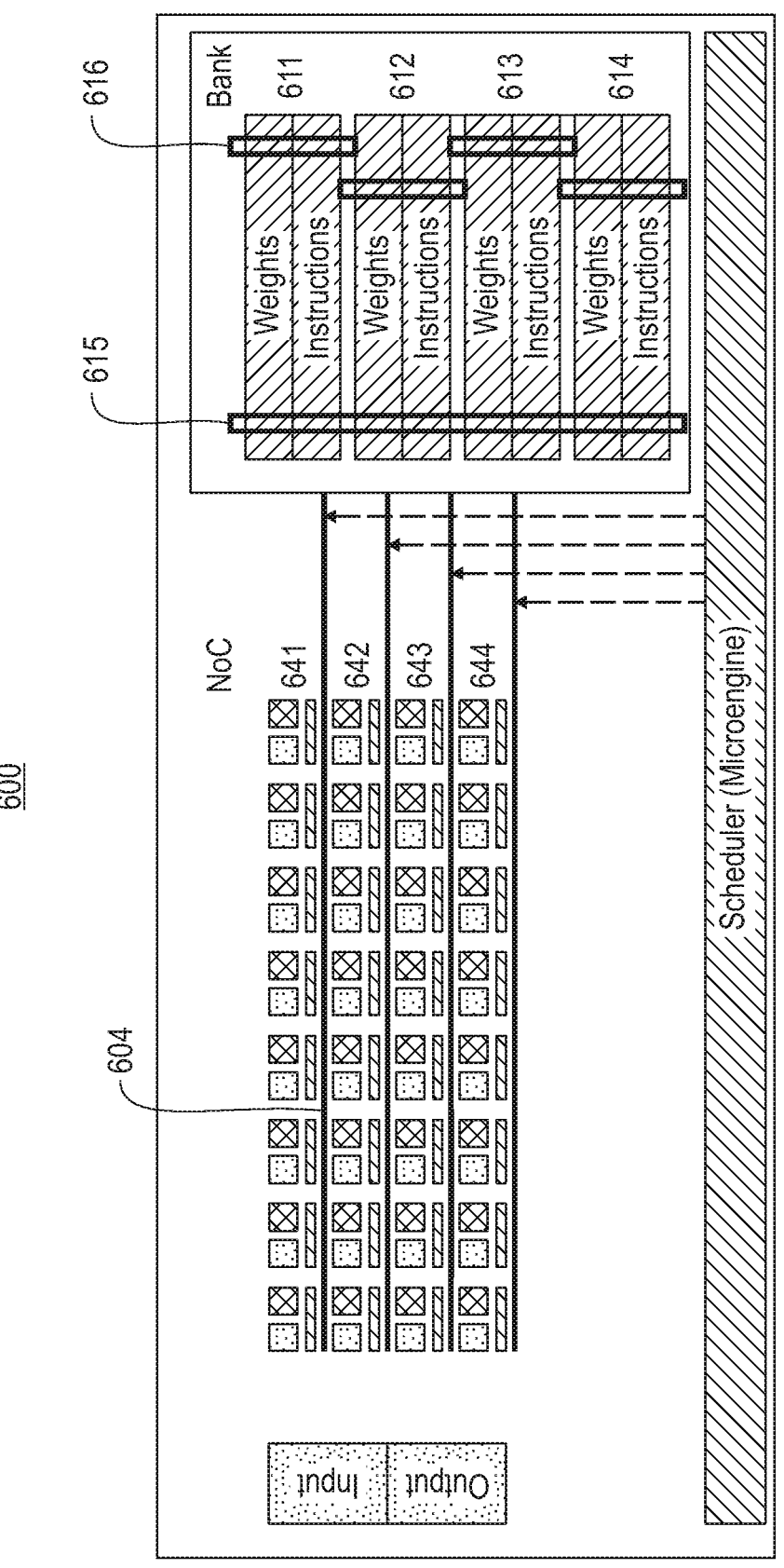
FIG. 6 illustrates an exemplary IPU network-on-chip (NoC) according to embodiments of the present disclosure.

Referring to FIG. 6, an exemplary IPU network-on-chip (NoC) is illustrated according to embodiments of the present disclosure. IPU 600 includes a row broadcast network on chip 604. Network 604 comprises a plurality of row networks 641 . . . 644, each connecting a row of cores within IPU 600. Such embodiments are suitable for use with a single scheduler, multiple schedulers in parallel, or a hierarchical configuration in which a single scheduler drives multiple schedulers in parallel.

In some embodiments, the IPU may operate in a Multiple Instruction, Multiple Data (MIMD) mode. In such embodiments, each core has different activation data. Weights and instructions are the same within each row of cores. However, between rows, each row of cores has different weights and/or instructions. In some embodiments, each parallel row networks 641 . . . 644 has a corresponding bank of memory 611 . . . 614, which holds the weights and instructions for the corresponding row of cores. Accordingly, the same weights and instructions may be sent to all cores by reading the same data from each bank 611 . . . 614 (as illustrated by the highlighted parallel addresses at 615). Different weights and instructions may be sent to the cores in each row by reading different data from each bank 611 . . . 614 (as illustrated by the highlighted addresses at 616).

In some embodiments, a single scheduler is used to implement a MIMD mode in IPU 600. In such embodiments, the same source address may be used across all memory banks (as illustrated at 615). Alternative, a different source address may be used for each memory bank (as illustrated at 616). In some such embodiments, the scheduler code includes the addresses for each memory bank. In other such embodiments, the scheduler code uses a single address to index into a look up table (LUT) which stores the addresses for each memory bank.

In some embodiments, multiple schedulers are used to implement a MIMD more in IPU 600. In some such embodiments, one scheduler is provided per bank 611 . . . 614. Each bank scheduler runs independent microcode and generates a source address for the corresponding memory bank.

In some embodiments, hierarchical schedulers are used to implement a MIMD mode in IPU 600. In some embodiments, one scheduler is provided per bank, and a supervisory scheduler is provided. In such embodiments, each bank scheduler runs independent microcode and generates a source address for the corresponding memory bank. The supervisory scheduler synchronizes operations between the bank schedulers.

Figure 7:
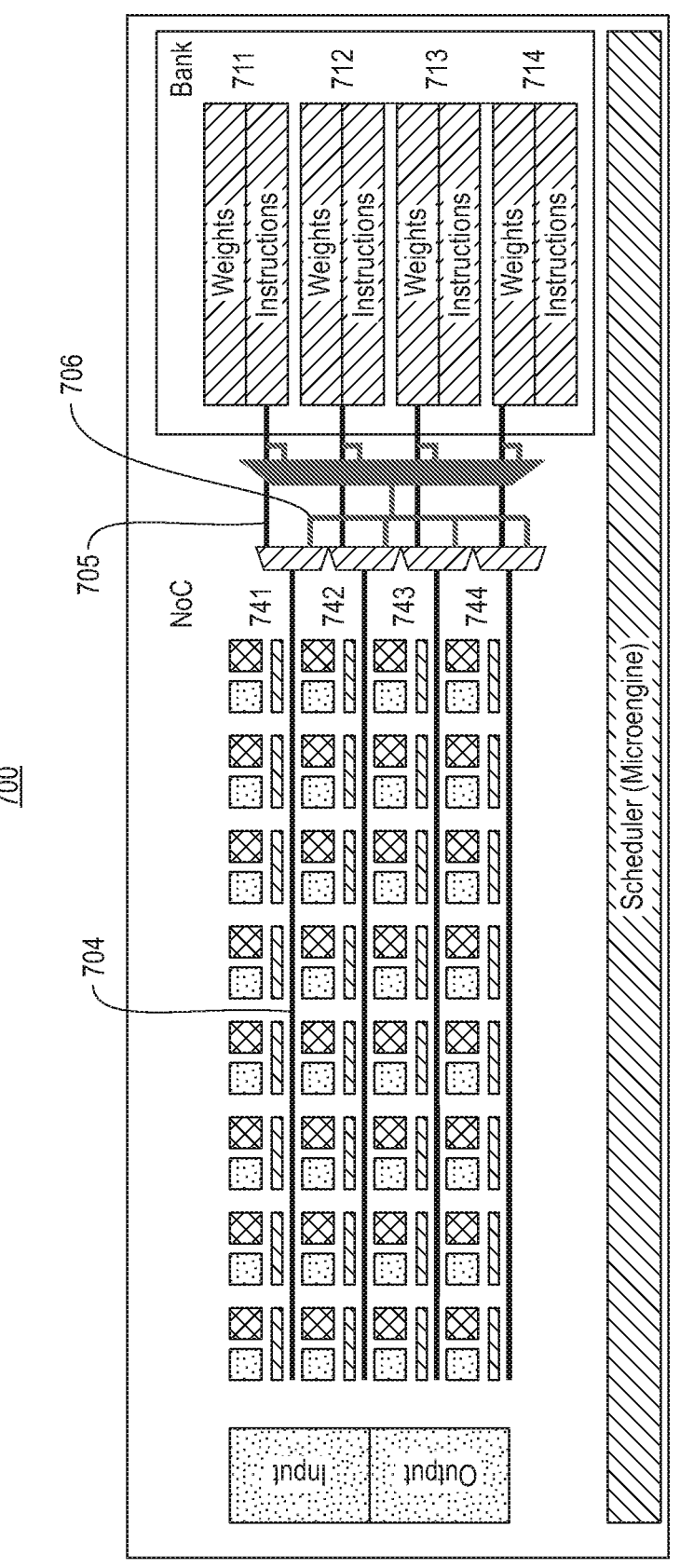
FIG. 7 illustrates an exemplary IPU network-on-chip (NoC) according to embodiments of the present disclosure.

Referring to FIG. 7, an exemplary IPU network-on-chip (NoC) is illustrated according to embodiments of the present disclosure. IPU 700 includes a row broadcast network on chip 704. Network 704 comprises a plurality of row networks 741 . . . 744, each connecting a row of cores within IPU 700. Row networks 741 . . . 744 are coupled to bank bypass bus 705 and global bus 706. The row distribution networks 741 . . . 744 may source weights and instructions from the bank bypass bus 705, thereby obtaining input from the memory bank 711 . . . 714 associated with each corresponding row. In particular, the bank bypass bus may be switched between a bank input and a global input for each row. The row distribution networks 741 . . . 744 may source weights and instructions from the global bus, which can draw input from any of memory banks 711 . . . 714. In particular, the global bus may be switched between the various banks. In this way, each row may receive either a row-specific input, or a selected global input. It will be appreciated that a variety of interconnects are suitable for such switching including various switches and gates known in the art.

Such embodiments are suitable for operation in both SIMD and MIMD modes. In various embodiments, SIMD or MIMD operation is programmable. For a given microcode instruction, the system can either be SIMD or MIMD (but not both). Likewise, it can switch between SIMD and MIMD modes of operation (or vice versa) after every microcode instruction.

Figure 8:
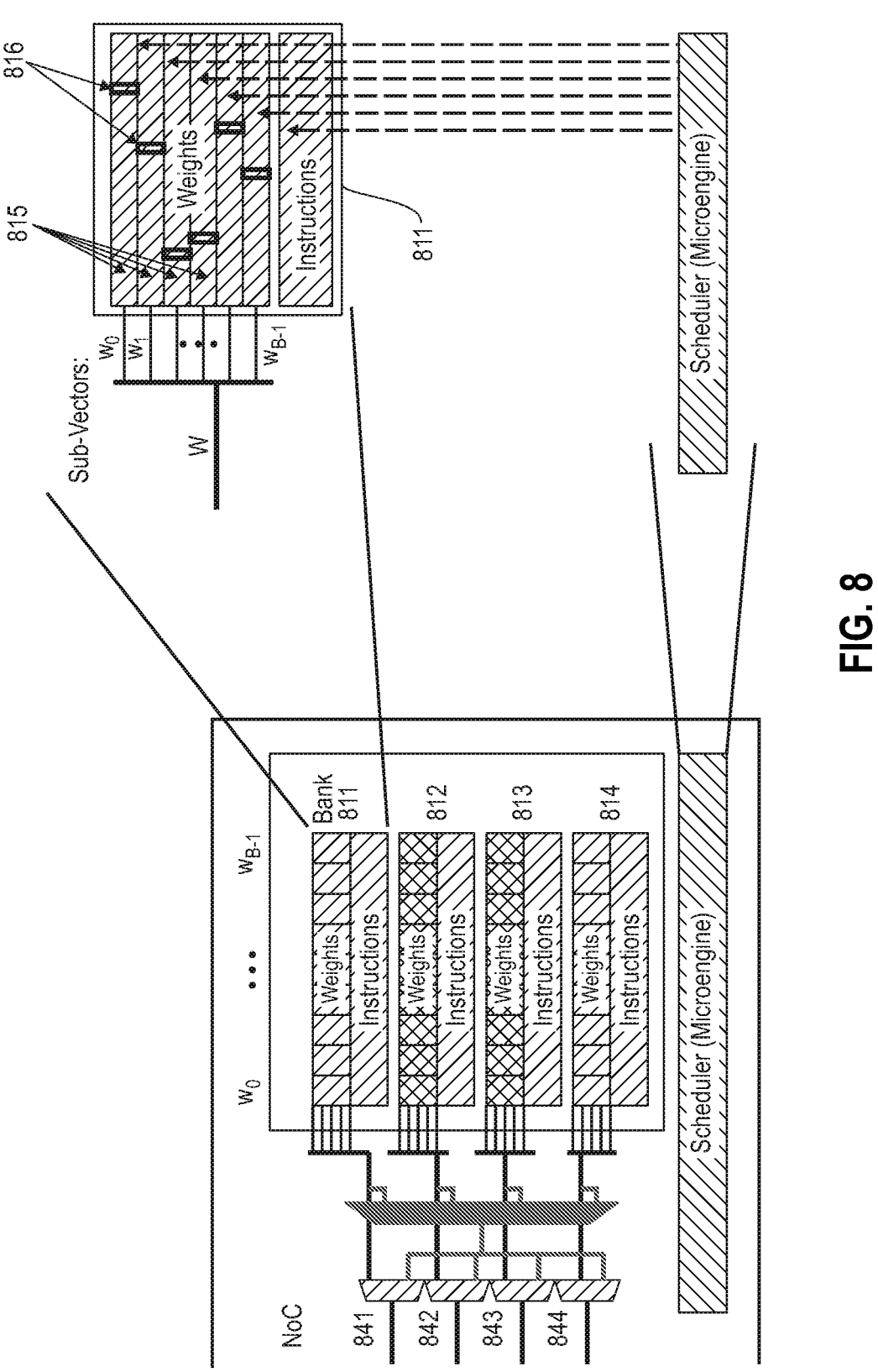
FIG. 8 illustrates an exemplary memory configuration of the IPU of FIG. 7 according to embodiments of the present disclosure.

Referring now to FIG. 8, an exemplary memory configuration of the IPU of FIG. 7 is illustrated according to embodiments of the present disclosure. Memory bank 811 is divided into a plurality of sub-banks 815. From each sub-bank, data are selected from non-contiguous memory locations 816. In this way, a block of synaptic weights may be assembled from a plurality of sub-vectors drawn from non-contiguous location in memory. Different sub-banks source each of the $w_b$ sub-vectors, as illustrated. The chip microengine(s) addresses each of the sub-banks, e.g., directly, algorithmically, or with a LUT.

The neural network weights, which may be referred to as a weight block, may be expressed as a matrix W. In some embodiments, W is B×B in dimension, where B is referred to as the block size. This W matrix can be decomposed into B sub-vectors $w_b$ that are each 1×B in dimension. Instead of reading out a W matrix from contiguous locations in memory, the W matrix can be constructed from the $w_b$ sub-vectors that are read from non-contiguous locations in memory. If a $w_b$ sub-vector is common across several W weight blocks, then only one copy of $w_b$ needs to be stored in the weight memory. This enables reduction in the amount of physical weight memory required, and increases the effective number of weight blocks, W, that can be stored, in the same amount of physical weight memory.

For example, a weight matrix W of size 4 may be defined as a composition of vectors as shown in Equation 1.

$$W = \begin{bmatrix} w_0 \\ w_1 \\ w_2 \\ w_3 \end{bmatrix} = \begin{bmatrix} 3 & 5 & 1 & 6 \\ 2 & 4 & 2 & -1 \\ -2 & -4 & 7 & 0 \\ 1 & 2 & -2 & -1 \end{bmatrix} \qquad \text{Equation 1}$$

$$w_0 = [3, 5, 1, 6]$$

$$w_1 = [2, 4, 2, -1]$$

$$w_2 = [-2, -4, 7, 0]$$

$$w_3 = [1, 2, -2, -1]$$

Figure 9:
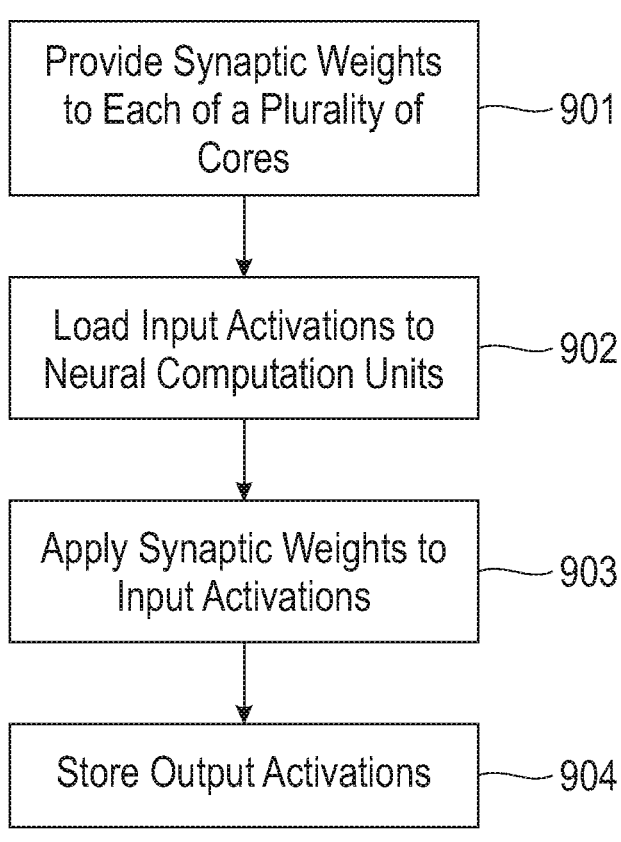
FIG. 9 illustrates a method of operating a neural inference processor according to embodiments of the present disclosure.

Referring now to FIG. 9, a method of operating a neural inference processor is illustrated according to embodiments of the present disclosure. At 901, a global scheduler provides synaptic weights from a neural network model memory to each of a plurality of cores. At 902, a local controller of each core loads input activations from an activation memory of the core to a neural computation unit of the core. At 903, a neural computation unit of each core applies the plurality of synaptic weights to the plurality of input activations to produce a plurality of output activations. At 904, the local controller of each core stores the plurality of output activations from the neural computation unit of the core to the activation memory of the core.

Figure 10:
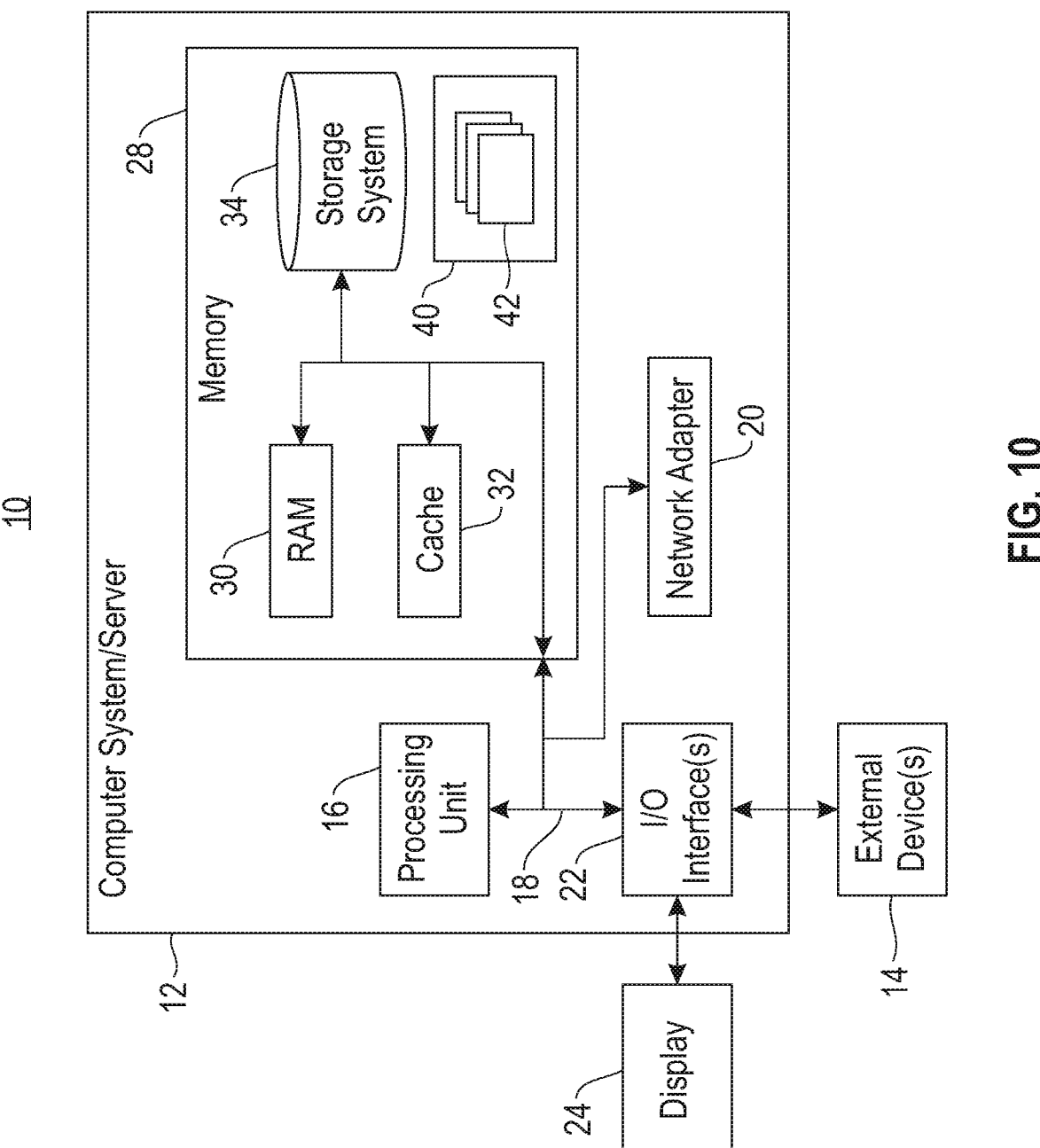
FIG. 10 depicts a computing node according to an embodiment of the present invention.

Referring now to FIG. 10, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a plurality of cores, the cores individually comprising:
a neural computation unit, the neural computation unit adapted to apply a plurality of synaptic weights to a plurality of input activations to produce a plurality of output activations,
an activation memory adapted to store the input activations and the output activations, and
a local controller, the local controller being adapted to load the input activations from the activation memory to the neural computation unit and to store the plurality of output activations from the neural computation unit to the activation memory;
a neural network model memory adapted to store the plurality of synaptic weights;
a plurality of network-on-chips (NoCs) configured to distribute the synaptic weights and instructions to the plurality of cores;
a global scheduler operatively coupled to the plurality of cores, the global scheduler adapted to:
load the synaptic weights and instructions from the neural network model memory to the cores without use of the local controller, and
communicate with the local controllers to share in scheduling operations of the system; and
a network,
wherein the network comprises a plurality of rows, respective ones of the rows being connected to a corresponding subset of the plurality of cores,

wherein each row comprises an interconnect operable to select between a broadcast input and a row-specific input,
wherein each of the cores have different associated activation data.

2. The system of claim 1, wherein the global scheduler is adapted to provide local controller instructions to the cores.

3. The system of claim 1, wherein the global scheduler provides the same synaptic weights to each of the cores.

4. The system of claim 2, wherein the global scheduler provides the same local controller instructions to each of the cores.

5. The system of claim 1, wherein the global scheduler provides different synaptic weights to at least some of the cores.

6. The system of claim 2, wherein the global scheduler provides different local controller instructions to at least some of the cores.

7. The system of claim 1, wherein the global scheduler provides the synaptic weights via the network.

8. The system of claim 1, wherein the global scheduler provides local controller instructions to the cores via the network.

9. The system of claim 1, wherein the network comprises a tree network.

10. The system of claim 1, wherein the network comprises a row broadcast network.

11. The system of claim 10, wherein the global scheduler directly provides the instructions to the neural computation units of the cores via a first of the NoCs, wherein the global scheduler directly provides the synaptic weights to the neural computation units of the cores via a second of the NoCs that is different than the first NoC.

12. The system of claim 11, wherein the activation data is stored as the input activations within the activation memory, wherein the synaptic weights provided via the second NoC are the same within each row of cores, wherein the synaptic weights of different rows of cores are different.

13. The system of claim 12 wherein the interconnect is operable by the global scheduler, wherein the instructions provided via the first NoC are the same within each row of cores, wherein the instructions of different rows of cores are different.

14. The system of claim 1, wherein the global scheduler is adapted to provide the synaptic weights from a plurality of non-consecutive regions of the neural network model memory.

15. A system comprising:
a neural computation unit, the neural computation unit adapted to apply a plurality of synaptic weights to a plurality of input activations to produce a plurality of output activations;
a neural network model memory adapted to store the plurality of synaptic weights;
an activation memory adapted to store the input activations and the output activations;
a local controller operatively coupled to the neural computation unit, the neural network model memory, and the activation memory; the local controller adapted to:
load the input activations from the activation memory to the neural computation unit, and store the plurality of output activations from the neural computation unit to the activation memory;
a plurality of network-on-chips (NoCs) configured to distribute the synaptic weights and instructions to the neural computation unit;

a plurality of schedulers operatively coupled to the neural computation unit, the neural network model memory, and the activation memory, the plurality of schedulers adapted to, in parallel:

load the synaptic weights and instructions from the neural network model memory to the neural computation unit without use of the local controller, and communicate with the local controller to share in scheduling operations of the system; and a network, wherein the network comprises a plurality of row networks, respective ones of the row networks connecting different corresponding subsets of a plurality of cores, wherein the respective cores have different associated activation data stored as the input activations within the activation memory.

16. A method comprising:

loading, by a global scheduler, synaptic weights and instructions from a neural network model memory to a plurality of cores without use of a local controller;

loading, by the local controllers of the cores, input activations from an activation memory of the respective core to a neural computation unit of the core;

applying, by the neural computation units of the cores, the synaptic weights to the input activations to produce a plurality of output activations; and storing, by the local controllers of the cores, the plurality of output activations from the neural computation unit of the respective core to the activation memory of the core, wherein the global scheduler communicates with the local controllers of the cores to share in scheduling core operations, and wherein the global scheduler directly provides the instructions to the neural computation units of the cores via a plurality of network-on-chips (NoCs), wherein a first of the NoCs is configured to distribute the synaptic weights to the plurality of cores, wherein a second of the NoCs that is different than the first NoC is configured to distribute the instructions to the plurality of cores, wherein the global scheduler provides the synaptic weights via a row broadcast network, wherein the row broadcast network is coupled to the plurality of cores, wherein the row broadcast network comprises a plurality of rows, respective ones of the rows being connected to a corresponding unique subset of the plurality of cores, wherein each row comprises an interconnect operable to select between a broadcast input and a row-specific input such that the respective cores have different associated activation data stored as the input activations within the activation memory, wherein the synaptic weights provided via the second NoC are the same within each row of cores, wherein the synaptic weights of different rows of cores are different.

17. The method of claim 16, further comprising:

providing, by the global scheduler, local controller instructions to the plurality of cores.

18. The method of claim 17, wherein the global scheduler provides the same local controller instructions to the plurality of cores.

19. The method of claim 17, wherein the global scheduler provides different local controller instructions to at least some of the cores.

20. The method of claim 16, wherein the global scheduler provides local controller instructions to cores via the row broadcast network.

21. The method of claim 16, wherein the global scheduler provides the synaptic weights from a plurality of non-consecutive regions of the neural network model memory.

22. The system of claim 15, wherein the synaptic weights and instructions are the same within the cores of the same subset of the plurality of cores, wherein the synaptic weights and instructions are different between the different subsets of the plurality of cores.

* * * * *